United States Patent
Mitchell et al.

(10) Patent No.: US 12,170,649 B2
(45) Date of Patent: Dec. 17, 2024

(54) RULE SELECTION MANAGEMENT BASED ON CURRENTLY AVAILABLE DOMAIN NAME SYSTEM (DNS) SERVERS

(71) Applicant: HYAS Infosec Inc., Vancouver (CA)

(72) Inventors: David J. Mitchell, Danville, CA (US); Paul C. van Gool, Santa Barbara, CA (US)

(73) Assignee: HYAS Infosec Inc., Vancouver (CA)

(*) Notice: Subject to any disclaimer, the term of this patent is extended or adjusted under 35 U.S.C. 154(b) by 188 days.

(21) Appl. No.: 17/737,316

(22) Filed: May 5, 2022

(65) Prior Publication Data
US 2023/0362132 A1   Nov. 9, 2023

(51) Int. Cl.
*G06F 21/00*    (2013.01)
*H04L 9/40*    (2022.01)
*H04L 61/4511*   (2022.01)

(52) U.S. Cl.
CPC ...... *H04L 63/0263* (2013.01); *H04L 61/4511* (2022.05); *H04L 63/0236* (2013.01)

(58) Field of Classification Search
CPC ............. H04L 63/0263; H04L 61/4511; H04L 63/0236
See application file for complete search history.

(56) References Cited

U.S. PATENT DOCUMENTS

| | | | | |
|---|---|---|---|---|
| 2011/0106919 A1* | 5/2011 | Mazur | ..................... | H04L 41/12 709/245 |
| 2012/0240213 A1* | 9/2012 | Lin | ..................... | H04W 12/122 726/12 |
| 2016/0269353 A1* | 9/2016 | Chan | .................... | H04L 12/6418 |
| 2018/0351904 A1* | 12/2018 | Mizik | ..................... | G06F 9/445 |
| 2021/0136037 A1* | 5/2021 | Balasubramaniam | ..................... | H04L 67/1036 |
| 2022/0124065 A1* | 4/2022 | Dao | ..................... | H04L 61/5007 |
| 2022/0377046 A1* | 11/2022 | Zhang | ..................... | H04L 67/51 |

* cited by examiner

*Primary Examiner* — Michael M Lee

(57) ABSTRACT

Systems, methods, and software are included herein to manage domain name system (DNS) requests to DNS servers. In one implementation, a computing device joins a local network and identifies a connection to a first DNS server associated with the local network. The computing device further implements first DNS rules based on the connection to the first server and monitors when a second DNS server is available using the local network. When the second DNS server becomes available, the computing device implements second DNS rules in place of the first DNS rules, wherein the second DNS rules direct DNS requests to the second DNS server in place of the first DNS server.

20 Claims, 5 Drawing Sheets

RULE SELECTION MANAGEMENT BASED ON CURRENTLY AVAILABLE DOMAIN NAME SYSTEM (DNS) SERVERS

BACKGROUND

In computing environments, domain name system (DNS) servers can be used to resolve DNS requests from computing devices. The DNS requests may include a domain name that is resolved by a DNS server to provide an internet protocol (IP) address to the requesting device. Once the IP address is returned, the computing device may retrieve or communicate any required data to the identified IP address.

Although DNS is a beneficial service, permitting users and applications to use strings, such as "www.example.com," to interact with networked services, DNS servers can also be used to direct computing devices to malicious systems and services. These malicious systems may provide viruses or malware to the contacting computing device, may provide a portal to extract personal information of the user of the computing device, or may provide some other malicious operation. To protect against the possible malicious attacks, some DNS providers may provide security that monitors the domain names and the associated IP addresses. These DNS providers may block, redirect, or otherwise prevent the connection to possibly malicious destinations. However, when joining a new network, a computing device may be directed to a new DNS server that does not provide protection against malicious destinations. This can cause a computing device to be vulnerable while connected to the new network.

OVERVIEW

Provided herein are systems, methods, and software manage connection rules based on available domain name service (DNS) servers. In one implementation, a method of operating a computing device includes identifying a connection to a first DNS server associated with a newly joined local network. In response to identifying the connection to the first DNS server, the method provides implementing first DNS rules based on the connection to the first DNS server. The method further includes monitoring when a second DNS server is available using the local network and, when the second DNS server is available, implementing second DNS rules in place of the first DNS rules, wherein the second DNS rules direct DNS requests to the second DNS server in place of the first DNS server.

In some implementations, the first DNS rules block at least a portion of DNS requests to the first DNS server. In some implementations, the first DNS rules cache DNS request information associated with DNS requests to the first DNS server, and the second DNS rules may forward the DNS request information to the second DNS server.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
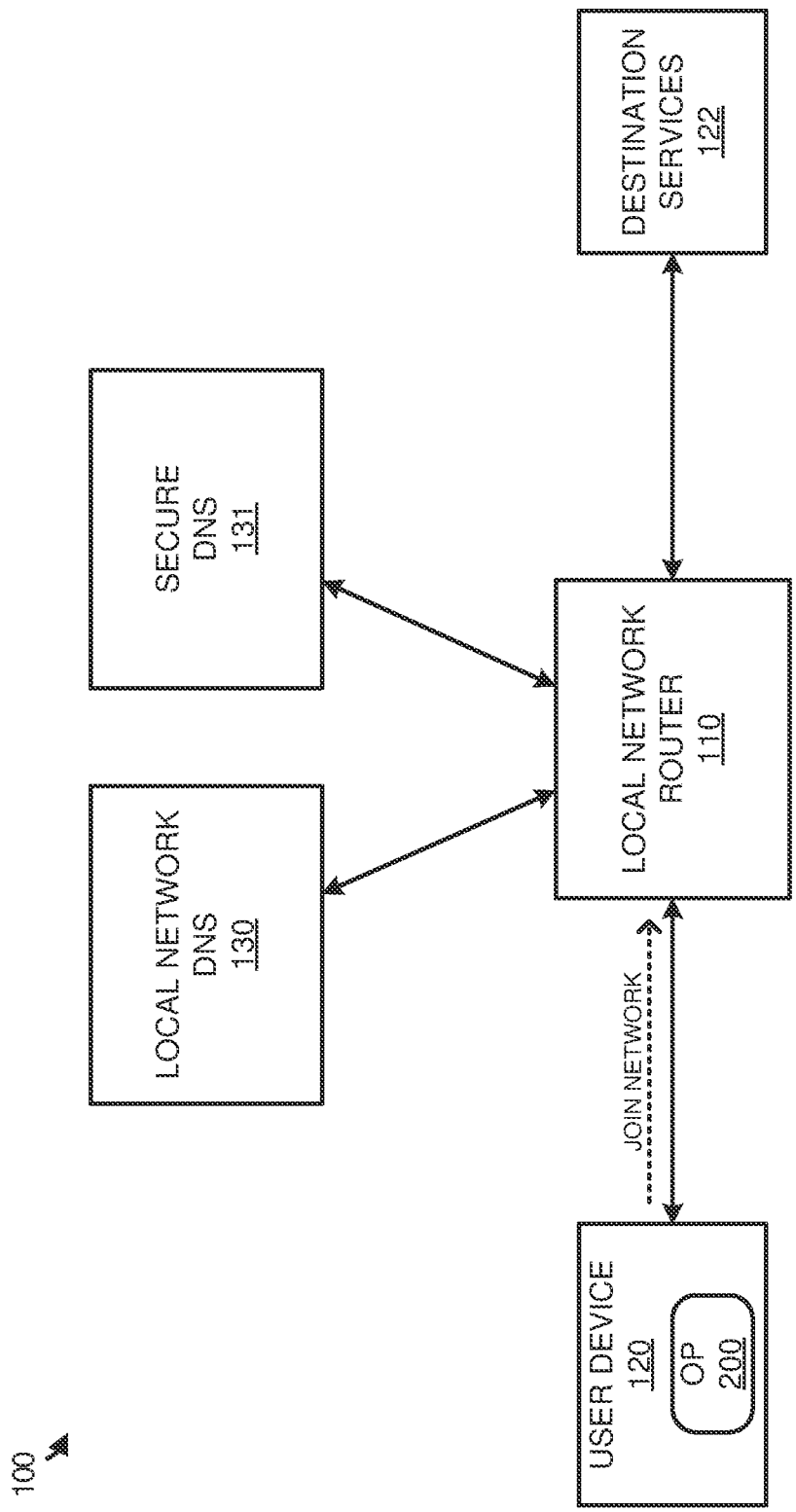
FIG. 1 illustrates a computing environment to manage domain name system (DNS) server selection according to an implementation.

FIG. 1 illustrates a computing environment 100 to manage domain name system (DNS) server selection according to an implementation. Computing environment 100 includes user device 120, local network router 110, destination services 122, local network DNS 130, and secure DNS 131. User device 120 provides operation 200 that is further described below in FIG. 2.

In computing environment 100, user device 120 joins a local network supported by local network router 110. The local network may comprise a public network, such as a restaurant or coffee shop network, may comprise a corporate private network, or may comprise some other local network. For example, a user of user device 120 may select the local network from available local networks, wherein the local network may connect to destination services 122 using local network router 110. Local network router 110 can be configured with a default DNS, represented as local network DNS 130. Local network DNS 130, which may reside at least partially on local network router 110, obtains DNS requests that include domain names or URLs and translate the domain names into IP addresses that are returned to the requesting device. For example, user device 120 may generate a DNS request using a web browser on the device, wherein the request is forwarded to local network router 110. Local network router 110 may forward the request to local network DNS 130 that translates the domain in the request to an IP address and returns the IP address via local network router 110 to user device 120.

In some implementations, local network DNS 130 may be used to provide advertisement information, terms of service, or other information to user device 120 and may limit the connections to external systems, such as secure DNS 131. Consequently, when user device 120 first joins the network, secure DNS 131 may initially be unavailable to user device 120. User device 120 may initiate communication requests to secure DNS 131 to determine when secure DNS 131 is available to respond to the requests. Once secure DNS 131 is available, DNS requests may be communicated to secure DNS 131. Secure DNS 131 may provide security in association with DNS requests, wherein secure DNS 131 may perform security checks on the domain (or URL), including the A/AAAA records, the nameserver, and the like, the IP address returned for the DNS request, or some other security check. In some implementations, secure DNS 131 generates a risk score associated with the DNS request based on the security check factors. Based on the risk score, secure DNS 131 may block a connection, permit a connection, redirect a connection, or provide some other rule in association with the DNS request.

In some examples, when user device 120 first joins local network router 110, user device 120 implements first DNS rules. The first DNS rules may permit all DNS requests to be forwarded to the local network DNS 130, may block all DNS requests to local network DNS 130, or may limit the DNS requests from one or more applications, may block requests to one or more domains, may cache DNS request information associated with requests to local network DNS 130, or may provide some other limitation in association with the requests to local network DNS 130. The limitations to the permitted types of DNS requests may be accomplished using whitelists, blacklists, or some combination thereof. As an example, the first DNS rules may prevent an application with one or more process identifiers (PIDs) from generating DNS requests to local network DNS 130. In another example, the first DNS rules may comprise a whitelist that permits DNS requests with one or more domains to be resolved using the first DNS server.

After user device 120 determines that secure DNS 131 is available, user device 120 implements second DNS rules. The second DNS rules direct DNS requests to secure DNS 131 over local network DNS 130 after the connection to secure DNS 131 is available. If any restrictions were implemented in association with applications or domains, the restrictions may be lifted or reduced. For example, while the first rules may block DNS requests from an application with a first process identifier, the second rules may permit the DNS requests from the application. In some implementations, the second rules may be used to obtain any cached DNS request information associated with DNS requests to local network DNS 130. The cached information may include domains, timestamps, returned IP addresses, or some other information. The cached information may represent requests from all applications or requests from a subset of applications.

Figure 2:
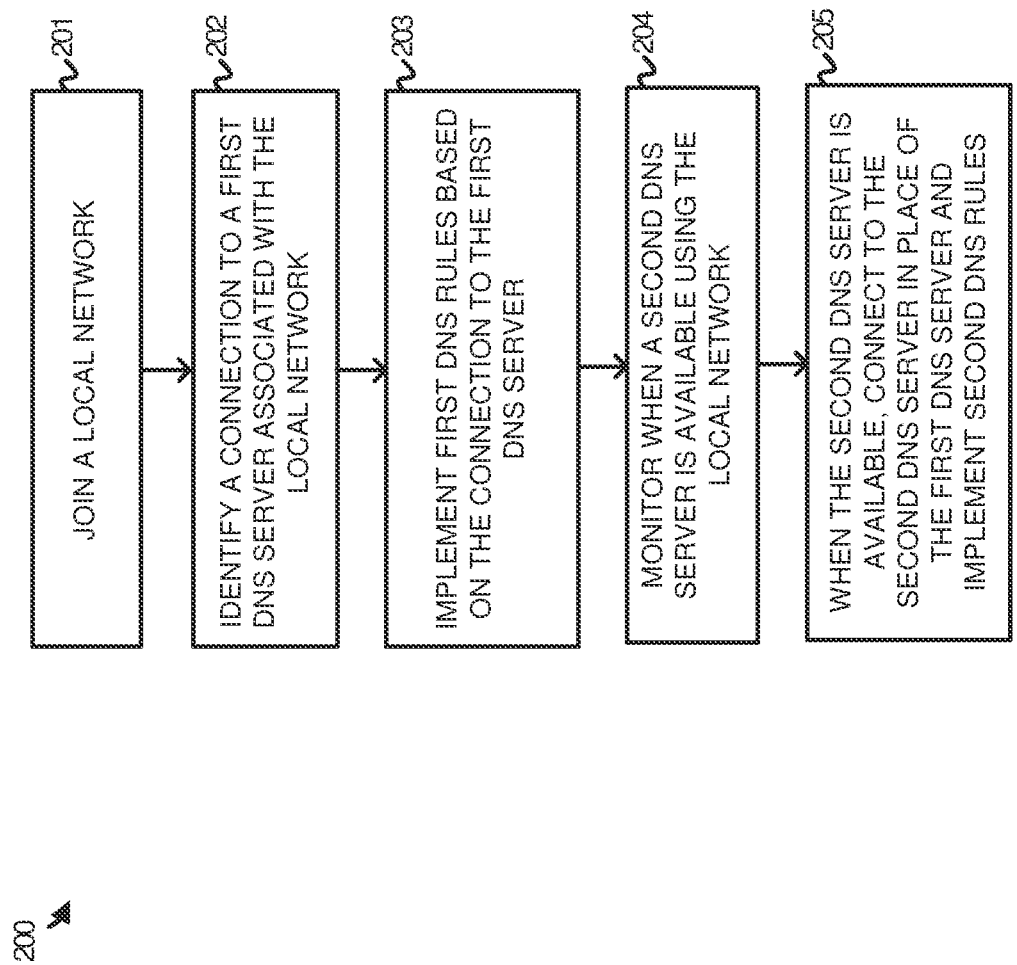
FIG. 2 illustrates an operation of a computing device to manage DNS server selection according to an implementation.

FIG. 2 illustrates an operation 200 of a computing device to manage DNS server selection according to an implementation. The steps of operation 200 are referenced parenthetically in the paragraphs that follow with reference to systems and elements of computing environment 100 of FIG. 1.

In operation 200, user device 120 joins (201) a local network using local network router 110. In response to joining the network, operation 200 identifies (202) a connection to a first DNS server associated with the local network. In some implementations, a local network may use a first DNS server to provide advertisement, security, or some other networking feature. For example, when user device 120 joins local network router 110, local network router 110 may default to providing DNS requests to local network DNS 130. While user device 120 is connected to local network DNS 130, operation 200 implements (203) first DNS rules. The first DNS rules may be used to block one or more DNS requests using the local network DNS, may cache DNS request information about the requests to local network DNS 130, or may provide some other rule. For example, user device 120 may cache domains associated with DNS requests communicated to local network DNS 130. Other DNS request information can include timestamps associated with the DNS requests, IP addresses returned as part of the DNS requests, or some other DNS request information.

As user device 120 implements the first DNS rules, operation 200 further monitors (204) when a second DNS server is available using the local network. In some implementations, user device 120 communicates communication requests to an IP address associated with secure DNS 131. Once a response is returned from secure DNS 131, user device 120 determines that secure DNS 131 is available. In some examples, user device 120 communicates the requests periodically, when DNS requests are required, or at some other interval. Once operation 200 determines that the second DNS server is available, operation 200 implements (205) second DNS rules in place of the first DNS rules, wherein the second DNS rules direct DNS requests to the second DNS server in place of the first DNS server. The second DNS rules may remove any application or domain restrictions in some examples, permitting the requests to be communicated to the second DNS server.

In some implementations, the first DNS rules cache DNS request information for the requests to local network DNS 130. Once a connection is established with secure DNS 131, user device 120 can forward the DNS request information to secure DNS 131. Secure DNS 131 may perform security checks using the DNS request information, wherein the security checks may identify the reputation associated with the domain, A/AAAA record information, name server information, IP address information associated with the DNS response, or some other information. Secure DNS 131 may communicate rules to user device 120 based on the security checks, wherein the rules can be used to block future communications to a destination service, block future DNS requests with a domain, or some other rule. For example, user device 120 can communicate DNS request information to secure DNS 131, wherein the DNS request information may correspond to one or more services in destination services 122. The services may comprise a web server, an email server, or some other service. In response to receiving the DNS request information, secure DNS 131 can perform security checks on the information and determine one or more rules to be communicated to user device 120, wherein the rules may permit communications, block communications, or provide some other action in association with the communications. In one example, secure DNS 131 generates a risk score associated with a domain and returned IP address. When the risk score indicates that the destination service is likely malicious, secure DNS 131 may communicate a rule to prevent future connections to the destination service. If the risk score indicates that the destination service is likely not malicious, secure DNS 131 may permit the communication or provide no further information about the connection.

In some implementations, after connecting to the second DNS server or the secure DNS server, the secure DNS server may become unavailable. Consequently, user device 120 may reconnect to local network DNS 130 and implement the first DNS rules in association with DNS requests. In some examples, user device 120 may provide information about local network DNS 130 to secure DNS 131. Secure DNS 131 may use the information to determine whether local network DNS 130 is trusted. The information may include an IP address for the local network DNS, any DNS information or corporate information associated with the provider of local network DNS 130, or some other information. Secure DNS 131 may communicate DNS request rules, such that if local network DNS 130 is required again, user device 120 may apply the rules provided by the secure DNS when using the local network DNS. The rules may block DNS requests if secure DNS 131 determines that the local network DNS is possibly malicious, may permit DNS requests if secure DNS 131 determines that the local network DNS is not malicious, may provide rules to cache DNS request information to identify further information associated with local network DNS 130, or may provide some other rules.

Figure 3:
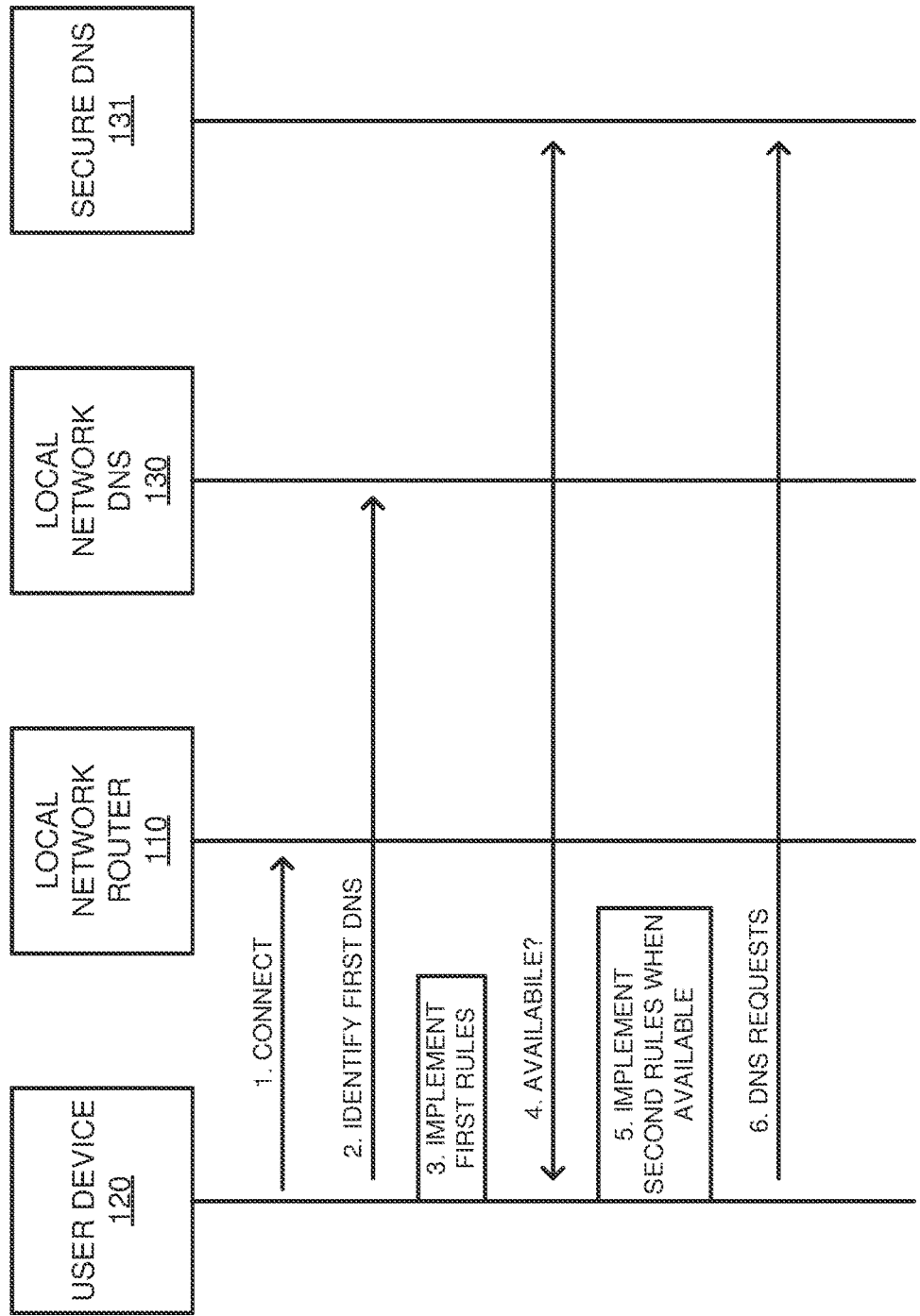
FIG. 3 illustrates a timing diagram to manage different rules for different DNS servers according to an implementation.

FIG. 3 illustrates a timing diagram 300 to manage different rules for different DNS servers according to an implementation. Timing diagram 300 includes user device 120, local network router 110, local network DNS 130, and secure DNS 131 from computing environment 100 of FIG. 1.

In timing diagram 300, user device 120 connects to local network router 110 at step 1. In response to connecting with local network router 110, user device 120 identifies a first DNS server at step 2 and implements first DNS rules at step 3. The first DNS rules may be used to cache DNS request information associated with DNS requests to local network DNS 130, may be used to block one or more DNS requests to local network DNS 130, or may be used to provide some other operation in association with the DNS requests. In some implementations, the first DNS rules can be used to identify domains of interest that are not to be forwarded to local network DNS 130. The domains of interest may correspond to domains with a higher security requirement, domains that are unknown, or some other domain of interest. For example, user device 120 can be configured to block DNS requests associated with a domain when the user device is not connected to the secure DNS. In some implementations, the first DNS rules can block DNS requests from one or more applications, wherein the process identifier associated with a DNS request can be inspected and compared to a white or blacklist to determine whether the request is permitted. If permitted, the DNS request can be forwarded to local network DNS 130. If unpermitted, the DNS request can be blocked or cached to be provided to secure DNS 131 when available.

After the first rules are implemented, user device 120 determines when secure DNS 131 is available at step 4. User device 120 may generate communication requests to secure DNS 131 and determine that secure DNS 131 is available after a response is received from secure DNS 131. The communication requests may be periodic, when a DNS request is required to go to secure DNS 131 in place of local network DNS 130, or at some other interval. For example, user device 120 may generate a connection request to secure DNS 131 every second after joining local network router 110 until a response is received from secure DNS 131.

Once it is determined that secure DNS 131 is available, user device implements second DNS rules at step 5. The second DNS rules may be used to forward all future DNS requests to secure DNS 131 in place of local network DNS 130, may be used to communicate any cached DNS request information for the requests to local network DNS 130, or may provide some other function in association with DNS requests. Once the second DNS rules are in place, user device can communicate DNS requests at step 6 to secure DNS 131. Secure DNS 131 may perform security tests on the DNS requests and determine whether to permit or deny connections in association with the requests. In some implementations, secure DNS 131 may return rules that can be used to block connections to requested domains, permit connections to requested domains, redirect connections to one or more domains, or perform some other action.

In one implementation, secure DNS 131 may perform security tests on the cached DNS request information associated with local network router 110. The security tests may be used to determine scores associated with the various domains and determine rules associated with the previously requested domains. The rules can then be forwarded to user device 120, wherein the rules can be used to terminate any connections that secure DNS 131 determines are potentially malicious. For example, the cached DNS request information may include a request for a first domain. In response to receiving the cached DNS request information, secure DNS 131 may generate a risk score associated with the domain based on the nameserver, A/AAAA records, location of the nameserver, or some other DNS information. The risk score can further be generated based on one or more databases that indicate whether the IP address associated with the end destination is potentially malicious. The databases can be maintained by secure DNS 131 or an external database, wherein the external database may perform various tests on the posture associated with the destination IP address. If the risk score indicates that the domain is malicious based on the risk score satisfying one or more criteria, secure DNS 131 may communicate a rule to terminate connections associated with the destination IP address associated with the domain request. If the risk score does not indicate that the destination is malicious, then secure DNS 131 may permit the connection or take no action.

In some implementations, after connecting to the secure DNS 131, the secure DNS server may become unavailable. Consequently, user device 120 may reconnect to local network DNS 130 and implement the first DNS rules in association with DNS requests. In some examples, user device 120 may provide information about local network DNS 130 to secure DNS 131. Secure DNS 131 may use the information to determine whether local network DNS 130 is trusted. The information may include an IP address for the local network DNS, any DNS information or corporate information associated with the provider of local network DNS 130, or some other information. Secure DNS 131 may communicate DNS request rules, such that if local network DNS 130 is required again, user device 120 may apply the rules provided by the secure DNS when using the local network DNS. The rules may block DNS requests if secure DNS 131 determines that the local network DNS is possibly malicious, may permit DNS requests if secure DNS 131 determines that the local network DNS is not malicious, may provide rules to cache DNS request information to identify further information associated with local network DNS 130, or may provide some other rules.

Figure 4:
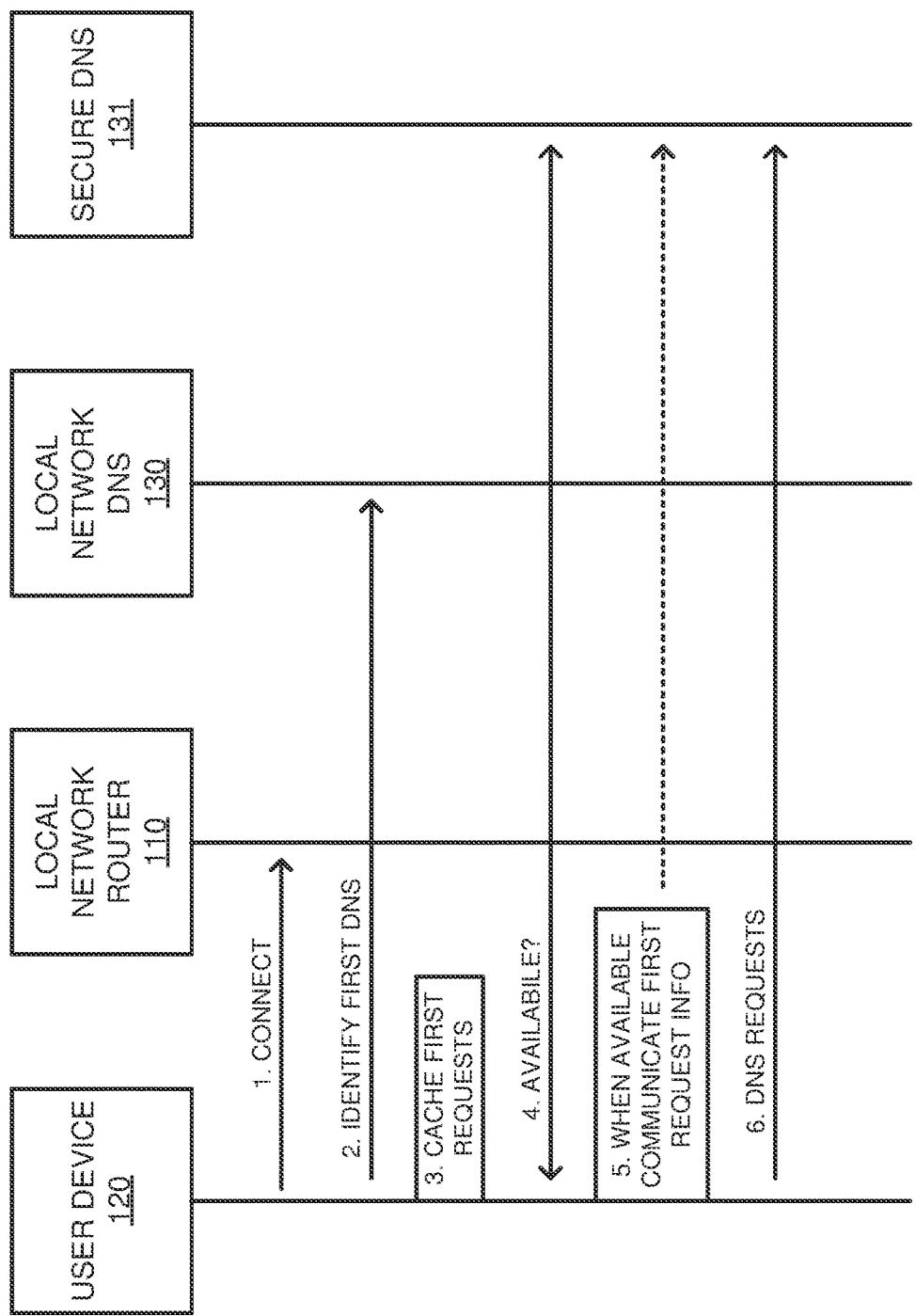
FIG. 4 illustrates a timing diagram to manage the caching of DNS request information to first DNS server according to an implementation.

FIG. 4 illustrates a timing diagram 400 to manage the caching of DNS request information to first DNS server according to an implementation. Timing diagram 400 includes user device 120, local network router 110, local network DNS 130, and secure DNS 131 from FIG. 1.

In timing diagram 400, user device 120 connects to local network router 110 at step 1. The connection may comprise a public connection without a password, may require a password, or may require some other credential in joining the network associated with local network router 110. In response to joining the network, user device 120 may identify, at step 2, local network DNS 130 that is used in association with local network router 110 and may further determine that a desired secure DNS 131 is unavailable. In some implementations, a local network router blocks connections to various external IP addresses to trigger a connection local network DNS 130 that can provide terms of service, security information, and the like.

In response to determining that secure DNS 131 is unavailable or identifying that the current DNS corresponds to local network DNS 130, user device 120 caches, at step 3, DNS request information associated with DNS requests to local network NDS 130. The cached information can include domains in the requests, timestamps associated with the requests, IP addresses returned for the requests, or some other information in association with the DNS requests. In addition to caching the first requests, user device 120 may further generate connection requests to secure DNS 131 to determine when the secure DNS is available at step 4. In some implementations, user device 120 is provided with one or more IP addresses associated with secure DNS 131, permitting user device to generate the connection requests to secure DNS 131.

Once user device 120 determines that secure DNS 131 is available, user device 120 communicates the DNS request information associated with the DNS requests to local network DNS 130 at step 5. Secure DNS 131 may use the DNS request information to determine whether any of the connection generated using the local network DNS 130 were malicious. The determination can be based on various factors including records associated with the domains, nameservers associated with the domains, posture information associated with the destination IP address for the connection request, or some other factor. If a domain is determined to be possibly malicious, then secure DNS 131 may communicate a rule to user device 120 stopping any connection associated with the potentially malicious domain. The domains that are determined to not likely be malicious may have no rule provided by secure DNS 131 to user device 120 or secure DNS 131 may expressly provide a rule permitting the connections. In other examples, secure DNS 131 may use the cached DNS request information to identify trends in requests associated with the local network DNS 130, trends in requests from user device 120, or some other monitoring operation in association with the DNS requests.

In addition to communicating the DNS request information to secure DNS 131, user device 120 communicates DNS requests to secure DNS 131 at step 6. The DNS request information can be provided prior to the DNS requests to secure DNS 131, after the DNS requests to secure DNS 131, or some combination thereof. In at least one example, user device 120 may communicate the cached DNS request information during a downtime for the device or at the request of secure DNS 131. In some implementations, the cached DNS request information may only represent a portion of the DNS requests to local network DNS 130. The portion may represent requests from one or more applications, requests to one or more domains of interest, or some other portion of the requests to local network DNS 130. For example, user device 120 may only cache DNS request information associated with DNS requests from an application with a higher security requirement. The application can be defined by the user, can be determined based on the process identifier for the application, can be defined by the developer of the application, or can be defined in some other manner.

Although demonstrated as caching the first requests to local network DNS 130, the caching of the request information is not required. In some implementations, the first rules may direct DNS requests to local network DNS 130, while the second rules direct DNS requests to secure DNS 131.

Figure 5:
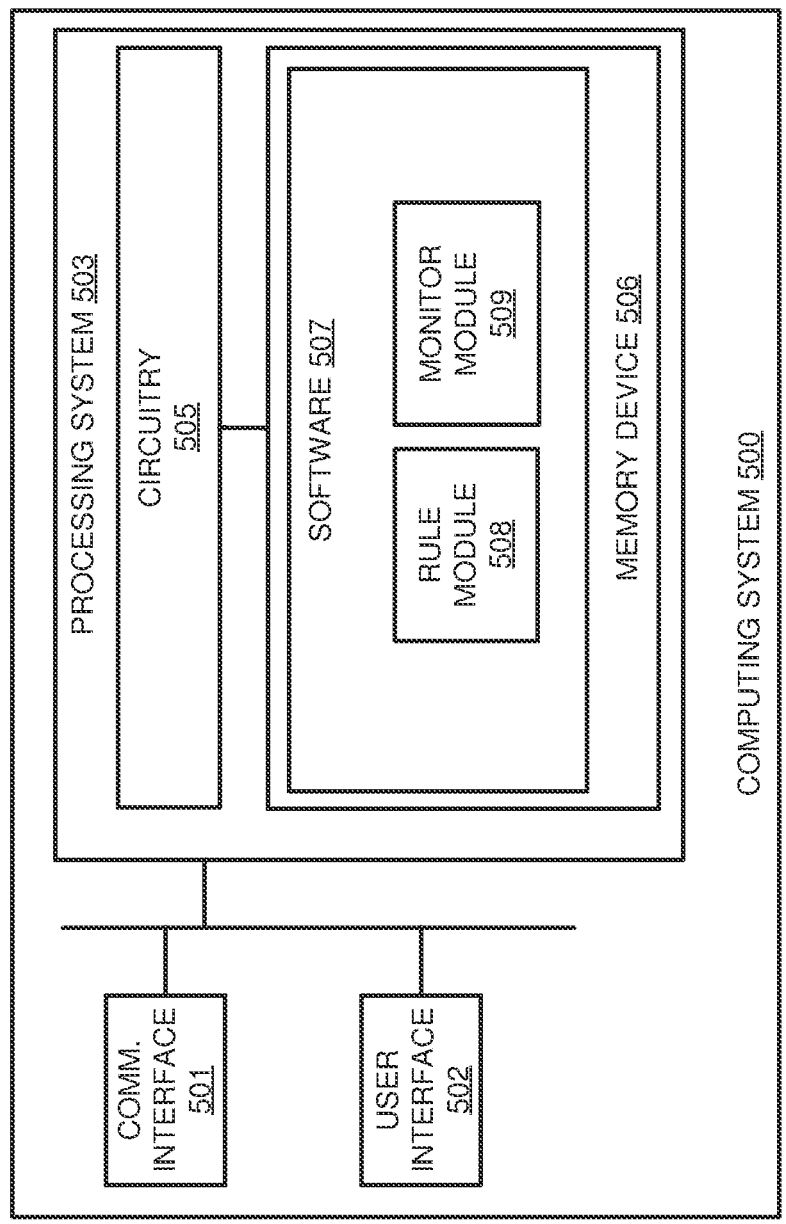
FIG. 5 illustrates a computing system to manage DNS server selection according to an implementation.

FIG. 5 illustrates a computing system 500 to manage DNS server selection according to an implementation. Computing system 500 is representative of any computing system or systems with which the various operational architectures, processes, scenarios, and sequences disclosed herein for a user device can be implemented. Computing system 500 is an example user device 120 of FIG. 1, although other examples may exist. Computing system 500 comprises communication interface 501, user interface 502, and processing system 503. Processing system 503 is linked to communication interface 501 and user interface 502. Processing system 503 includes processing circuitry 505 and memory device 506 that stores operating software 507. Computing system 500 may include other well-known components such as a battery and enclosure that are not shown for clarity.

Communication interface 501 comprises components that communicate over communication links, such as network cards, ports, radio frequency (RF), processing circuitry and software, or some other communication devices. Communication interface 501 may be configured to communicate over metallic, wireless, or optical links. Communication interface 501 may be configured to use Time Division Multiplex (TDM), Internet Protocol (IP), Ethernet, optical networking, wireless protocols, communication signaling, or some other communication format—including combinations thereof. In at least one implementation, communication interface 501 can be used to communicate with routers of local networks. The communication interface may further use the each of the routers to connect to servers, other user computing devices, or some other computing device or service.

User interface 502 comprises components that interact with a user to receive user inputs and to present media and/or information. User interface 502 may include a speaker, microphone, buttons, lights, display screen, touch screen, touch pad, scroll wheel, communication port, or some other user input/output apparatus—including combinations thereof. User interface 502 may be omitted in some examples.

Processing circuitry 505 comprises microprocessor and other circuitry that retrieves and executes operating software 507 from memory device 506. Memory device 506 may include volatile and nonvolatile, removable, and non-removable media implemented in any method or technology for storage of information, such as computer readable instructions, data structures, program modules, or other data. Memory device 506 may be implemented as a single storage device but may also be implemented across multiple storage devices or sub-systems. Memory device 506 may comprise additional elements, such as a controller to read operating software 507. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 505 is typically mounted on a circuit board that may also hold memory device 506 and portions of communication interface 501 and user interface 502. Operating software 507 comprises computer programs, firmware, or some other form of machine-readable program instructions. Operating software 507 includes request module 508 and malicious module 509, although any number of software modules may provide a similar operation. Operating software 507 may further include an operating system, utilities, drivers, network interfaces, applications, or some other type of software. When executed by processing circuitry 505, operating software 507 directs processing system 503 to operate computing system 500 as described herein.

In one implementation, monitor module 509 directs processing system 503 to monitor when computing system 500 joins a local network. The local network may comprise a wireless local area network, a wired local area network, or some other local area network. In response to joining the network monitor module 509 directs processing system 503 to identify a connection a first DNS server, wherein the first DNS server may correspond to a default DNS server associated with the local area network. After identifying the connection to the first DNS server, rule module 508 directs processing system 503 to implement first DNS rules based on the connection to the first DNS server. In some implementations, monitor module 509 may determine that the first DNS server does not represent a secure or trusted DNS server and may implement rules associated with the untrusted DNS server associated with the new local area network. The first rules may include caching DNS requests to the first DNS server, blocking DNS requests for specific domains, blocking DNS requests derived from one or more applications on computing system 500, or providing some other operation to limit the rules. In some examples, rule module 509 may maintain white or blacklists that indicate the domains or applications that are permitted to generate egress DNS requests to the first DNS server. For example, a whitelist may include one or more domains of interest that are permitted to be included in DNS requests. In another example, a blacklist may include one or more applications that are not permitted to generate DNS requests while connected to the first DNS server or untrusted DNS server.

While implementing the first rules when connected to the first DNS server, monitor module 509 directs processing system 503 to monitor when a second DNS server is available using the local network. The second DNS server may comprise a trusted DNS server that can perform one or more security checks in association with the DNS requests. The security checks may correspond to the domain or URL included in the DNS request, may correspond to the IP address that is returned as part of the DNS request, or may provide some other security check. The second DNS server may provide rules that can be used to block, permit, redirect, or provide some other function in association with a DNS request. As an example, when the second DNS server receives a DNS request from computing system 500, the second DNS server may generate a score based on trust factors associated with the domain request (e.g., records, nameserver, and the like), may generate the score based on whether the returned IP address is indicated to be possibly malicious, or may generate the score based on some other factor. If the score indicates that the destination associated with the DNS request is possible malicious, then the second DNS server may provide a rule to block or redirect the communication. If the score indicates that the destination associated with the DNS request is not likely malicious, then the second DNS server may permit the communication or return the desired destination IP address associated with the DNS request.

In some implementations, monitor module 509 directs processing system 503 to communicate communication requests to the second DNS server at intervals to determine when a connection is established. When a response is provided by the second DNS server indicating that the connection is available, rule module directs processing system 503 to implement second DNS rules in place of the first DNS rules, wherein the second DNS rules direct DNS requests to the second DNS server in place of the first DNS server.

In at least one example, the second DNS rules direct computing system 500 to provide the cached DNS request information associated with the first DNS server. In forwarding the cached DNS request information, the second DNS server may determine whether any of the destination services provided to computing system 500 while using the first DNS server were malicious. The second DNS server may generate a score based on a variety of security check factors and may provide back one or more rules based on the score. The security check factors may include trust factors associated with the domain lookup (e.g., records, nameserver, and the like), may include consulting one or more databases indicating lists of IP addresses that are possibly malicious, or may include some other factor. For example, if a score for a DNS request satisfied one or more criteria, the second DNS server may distribute a rule back to the user device indicating that any future connections to the IP address associated with the DNS request should be terminated. In contrast, any DNS request score that does not satisfy the one or more criteria may be permitted to continue. In addition to performing security checks on the DNS requests to the first DNS server, the second DNS server will act as the DNS server for future requests and perform security checks as required on the DNS requests.

In some implementations, when connected to the first DNS server and unable to connect with the second DNS server, the first rules may permit all DNS requests to the first DNS server. However, once the second DNS server is available, computing system 500 may direct all future requests to the second DNS server. Advantageously, computing system 500 may switch to the more secure or preferred DNS server as soon as the server is available.

In some implementations, the second DNS server may become unavailable due to changes in network connectivity, rules implemented by the local router, or for some other reason. In response to determining that the second DNS server is unavailable, computing system 500 may revert to using the first DNS server or the local DNS server. In reverting to the first DNS server, computing system 500 may use the first DNS rules or may use alternative DNS rules based on reverting to the first DNS server. In some implementations, the secure DNS server may evaluate whether the first DNS server can be trusted. The evaluation can be based on a variety of factors, including the IP address associated with the first DNS server, any domain or ownership information associated with the first DNS server, or some other factor. The factors may be shared by computing system 500 when a connection is established with the second DNS server. If the first DNS server is trusted, the second DNS server may provide rules that permit DNS requests to the first DNS server when the second DNS server is unavailable. If the first DNS server is not trusted, the second DNS server may provide rules that prevent DNS requests to the first DNS server, cache any DNS requests to the first DNS server, or provide some other action based on the first DNS server not being trusted.

Returning to the elements of FIG. 1, user device 120, local network router 110, local network DNS 130, secure DNS 131, and destination services 122 may each comprise communication interfaces, network interfaces, processing systems, computer systems, microprocessors, storage systems, storage media, or some other processing devices or software systems and can be distributed among multiple devices. Examples of user device 120, local network router 110, local network DNS 130, secure DNS 131, and destination services 122 can include software such as an operating system, logs, databases, utilities, drivers, networking software, and other software stored on a computer-readable medium. User device 120, local network router 110, local network DNS 130, secure DNS 131, and destination services 122 may comprise, in some examples, one or more server computing systems, desktop computing systems, laptop computing systems, or any other computing system, including combinations thereof.

Communication between user device 120, local network router 110, local network DNS 130, secure DNS 131, and destination services 122 may use metal, glass, optical, air, space, or some other material as the transport media. Communication between user device 120, local network router 110, local network DNS 130, secure DNS 131, and destination services 122 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between user device 120, local network router 110, local network DNS 130, secure DNS 131, and destination services 122 may be a direct link or can include intermediate networks, systems, or devices, and can include a logical network link transported over multiple physical links.

The included descriptions and figures depict specific implementations to teach those skilled in the art how to make and use the best option. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a computing device to manage domain name system (DNS) requests to DNS servers, the method comprising:
    in response to the computing device joining a local network, identifying a connection to a local DNS server associated with the local network;
    implementing first DNS rules based on the connection to the local DNS server;
    after identifying the connection to the local DNS server, making a determination that a secure DNS server is unavailable, wherein the secure DNS server is configured to provide enhanced security compared to the local DNS server by assessing risks associated with domains identified in the DNS requests;
    continuing to implement the first DNS rules in response to the determination;
    after the determination, making a subsequent determination that the secure DNS server is available; and
    in response to the subsequent determination that the secure DNS server is available, implementing second DNS rules in place of the first DNS rules, wherein the second DNS rules direct the DNS requests to the secure DNS server in place of the local DNS server.

2. The method of claim 1, wherein the making the subsequent determination that the secure DNS server is available comprises receiving, from the secure DNS server, a response to a communication request.

3. The method of claim 2 further comprising:
    communicating a plurality of communication requests to the secure DNS server, wherein the plurality of communication requests comprises the communication request.

4. The method of claim 1, wherein the implementing the first DNS rules based on the connection comprises blocking the DNS requests to the local DNS server.

5. The method of claim 1, wherein the implementing the first DNS rules based on the connection to the local DNS server comprises:
    identifying one or more domains of interest; and
    blocking the one or more domains of interest from completing a DNS request to the local DNS server.

6. The method of claim 1, wherein the implementing the first DNS rules comprises caching DNS request information for the DNS requests to the local DNS server.

7. The method of claim 6, wherein the second DNS rules forward the DNS request information to the secure DNS server.

8. A computing apparatus for managing domain name system (DNS) requests to DNS servers comprising:
    one or more non-transitory computer readable storage media;
    processing circuitry operatively coupled to the one or more non-transitory computer readable storage media; and
    program instructions stored on the one or more non-transitory computer readable storage media to operate a computing device that, when executed by the processing circuitry, direct the processing circuitry to:
        in response to the computing device joining a local network, identify a connection to a local DNS server associated with the local network;
        implement first DNS rules based on the connection to the local DNS server;
        after identifying the connection to the local DNS server, make a determination that a secure DNS server is unavailable, wherein the secure DNS server is configured to provide enhanced security compared to the local DNS server by assessing risks associated with domains identified in the DNS requests;
        continue to implement the first DNS rules in response to the determination;
        after the determination, make a subsequent determination that the secure DNS server is available; and
        in response to the subsequent determination that the secure DNS server is available, implement second DNS rules in place of the first DNS rules, wherein the second DNS rules direct the DNS requests to the secure DNS server in place of the local DNS server.

9. The computing apparatus of claim 8, wherein the making the subsequent determination that the secure DNS server is available comprises receiving, from the secure DNS server, a response to a communication request.

10. The computing apparatus of claim 9, wherein the program instructions further direct the computing apparatus to communicate a plurality of communication requests to the secure DNS server, wherein the plurality of communication requests comprises the communication request.

11. The computing apparatus of claim 8, wherein the implementing the first DNS rules based on the connection comprises blocking the DNS requests to the local DNS server.

12. The computing apparatus of claim 8, wherein the implementing the first DNS rules based on the connection to the local DNS server comprises:
    identifying one or more domains of interest; and
    blocking the one or more domains of interest from completing a DNS request to the local DNS server.

13. The computing apparatus of claim 8, wherein the implementing the first DNS rules comprises caching DNS request information for the DNS requests to the local DNS server.

14. The computing apparatus of claim 13, wherein the second DNS rules forward the DNS request information to the secure DNS server.

15. A non-transitory computer-readable storage media having program instructions stored thereon to manage domain name system (DNS) requests to DNS servers, wherein the program instructions, upon execution by at least one processor, cause the at least one processor to:
- in response to a computing device joining a local network, identify a connection to a local DNS server associated with the local network;
- implement first DNS rules based on the connection to the local DNS server;
- after identifying the connection to the local DNS server, making a determination that a secure DNS server is unavailable, wherein the secure DNS server is configured to provide enhanced security compared to the local DNS server by assessing risks associated with domains identified in the DNS requests;
- continuing to implement the first DNS rules in response to the determination;
- after the determination, making a subsequent determination that the secure DNS server is available; and
- in response to the subsequent determination that the secure DNS server is available, implement second DNS rules in place of the first DNS rules, wherein the second DNS rules direct the DNS requests to the secure DNS server in place of the local DNS server.

16. The non-transitory computer-readable storage media device of claim 15, wherein the making the subsequent determination that the secure DNS server is available comprises receiving, from the secure DNS server, a response to a communication request.

17. The non-transitory computer-readable storage media device of claim 16, wherein the program instructions further direct the at least one processor to communicate a plurality of communication requests to the secure DNS server, wherein the plurality of communication requests comprises the communication request.

18. The non-transitory computer-readable storage media device of claim 15, wherein the implementing the first DNS rules based on the connection comprises blocking the DNS requests to the local DNS server.

19. The non-transitory computer-readable storage media device of claim 15, wherein the implementing the first DNS rules comprises caching DNS request information for the DNS requests to the local DNS server.

20. The non-transitory computer-readable storage media device of claim 19, wherein the second DNS rules forward the DNS request information to the secure DNS server.

* * * * *